United States Patent

Newman

[15] 3,642,330
[45] Feb. 15, 1972

[54] ROLLER WAY BEARING

[72] Inventor: William G. Newman, Oak Park, Mich.
[73] Assignee: Beaver Precision Products, Inc., Troy, Mich.
[22] Filed: Dec. 22, 1969
[21] Appl. No.: 886,943

[52] U.S. Cl. ............................................308/6 C, 308/215
[51] Int. Cl. ....................................F16c 29/06, F16c 33/36
[58] Field of Search ..................308/6 C, 207, 215, 226, 203

[56] References Cited

UNITED STATES PATENTS

| | | | |
|---|---|---|---|
| 3,101,978 | 8/1963 | Stallman | 308/6 C |
| 54,156 | 4/1866 | Hickok | 308/215 X |
| 1,801,121 | 4/1931 | Symington | 308/226 |
| 3,413,045 | 11/1968 | Wohlfeld | 308/6 |

FOREIGN PATENTS OR APPLICATIONS

| | | | |
|---|---|---|---|
| 761,699 | 11/1956 | England | 308/6 C |

Primary Examiner—Martin P. Schwadron
Assistant Examiner—Barry Grossman
Attorney—Wolfe, Hubbard, Leydig, Voit & Osann

[57] ABSTRACT

The rollers of a recirculating roller way bearing are crowned convexly to distribute the loading on each roller more uniformly across the entire length thereof and thereby increase the load-bearing capacity of the roller and to reduce skewing caused by excessive and unequal loading on the ends of the roller. Strap-type retainers hold the rollers in the race of the bearing without guiding the rollers as they circulate so as to leave the bearings free to align themselves in the race.

14 Claims, 12 Drawing Figures

INVENTOR.
WILLIAM G. NEWMAN,
BY Wolfe, Hubbard, Voit & Osann
ATTORNEYS.

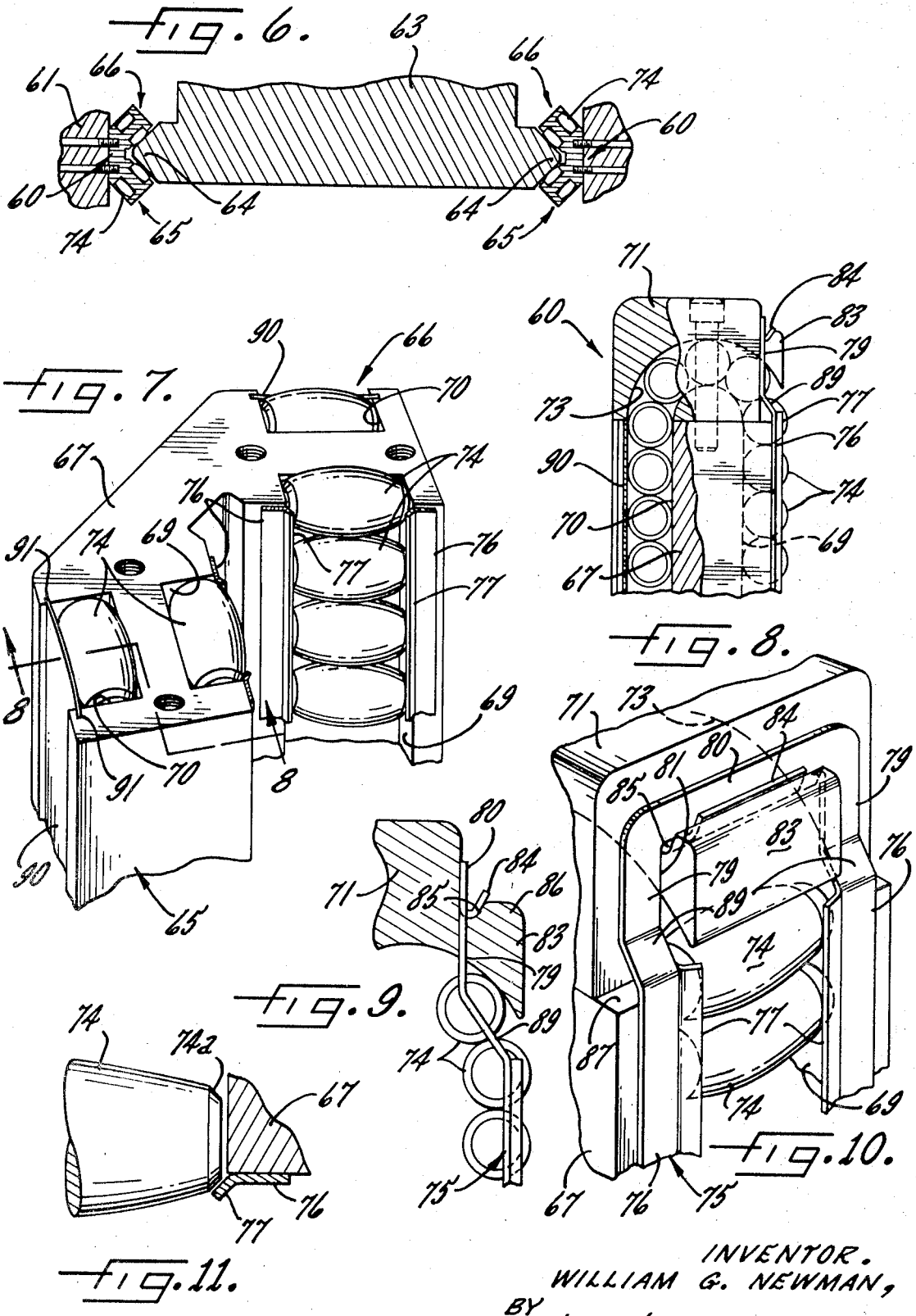

ROLLER WAY BEARING

BACKGROUND OF THE INVENTION

This invention relates to a recirculating roller way bearing adapted to support one member for linear movement on and relative to another member such as the way of a machine tool. More particularly, the invention relates to a bearing formed with a race within which elongated rollers circulate and roll between the way and a load track in the bearing, the rollers being loaded radially when travelling between the way and the track.

SUMMARY OF THE INVENTION

The primary aim of the present invention is to increase the load-bearing capacity of the rollers, to increase the ability of the rollers to comply to the way in spite of deflection of the member mounting the bearing, and to reduce the tendency of the rollers to skew sidewise as they travel along the way. These ends are achieved by convexly crowning each roller along its length so as to enable the roller to rock on the way when its mounting member is deflected, to reduce the concentration of radial loading at the ends of the roller, and to distribute the loading more uniformly along the entire length of the roller.

A further object is to provide new and improved retainers of comparatively simple construction for holding the rollers in the bearing race while leaving the rollers free to align themselves automatically on the load track to roll precisely in the direction of linear movement even though the race itself is slightly misaligned with such direction.

The invention also resides in the novel construction of a cover plate for holding the rollers as they ride along the return run of the bearing race.

These and other objects and advantages of the invention will become apparent from the following detailed description when taken in conjunction with the accompany drawings.

BRIEF DESCRIPTION OF THE DRAWINGS

FIG. 6 is a fragmentary cross section taken vertically through a machine tool equipped with new and improved bearings of still another type.

FIG. 7 is an enlarged fragmentary perspective view of parts of one of the bearings shown in FIG. 6.

FIG. 8 is a fragmentary cross section taken substantially along the line 8—8 of FIG. 7.

FIG. 9 is an enlarged view of parts shown in FIG. 8.

FIG. 10 is an enlarged perspective view of parts shown in FIGS. 7 and 8.

FIG. 11 is an enlarged view of one of the rollers and retainers shown in FIGS. 7 and 10.

DETAILED DESCRIPTION OF THE PREFERRED EMBODIMENTS

Figure 1:
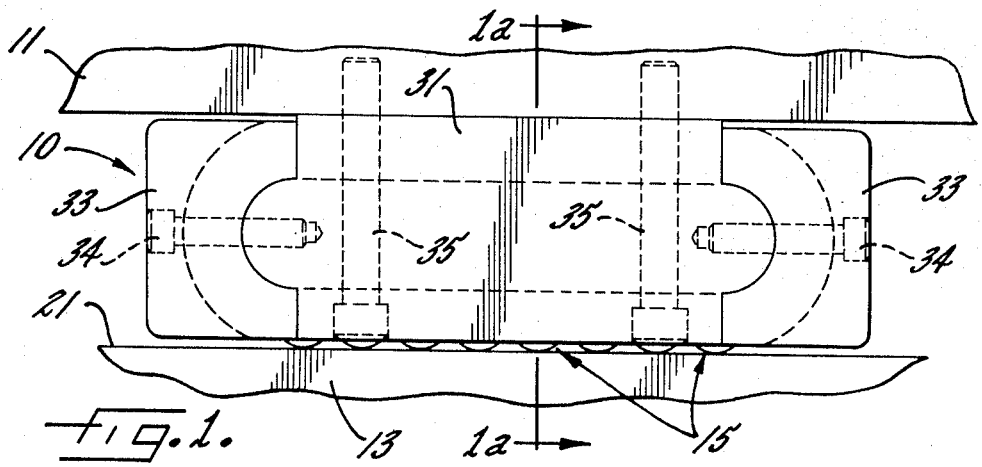
FIG. 1 is a fragmentary side elevational view of a machine tool equipped with a new and improved roller way bearing embodying the novel features of the present invention.
Figure 2:
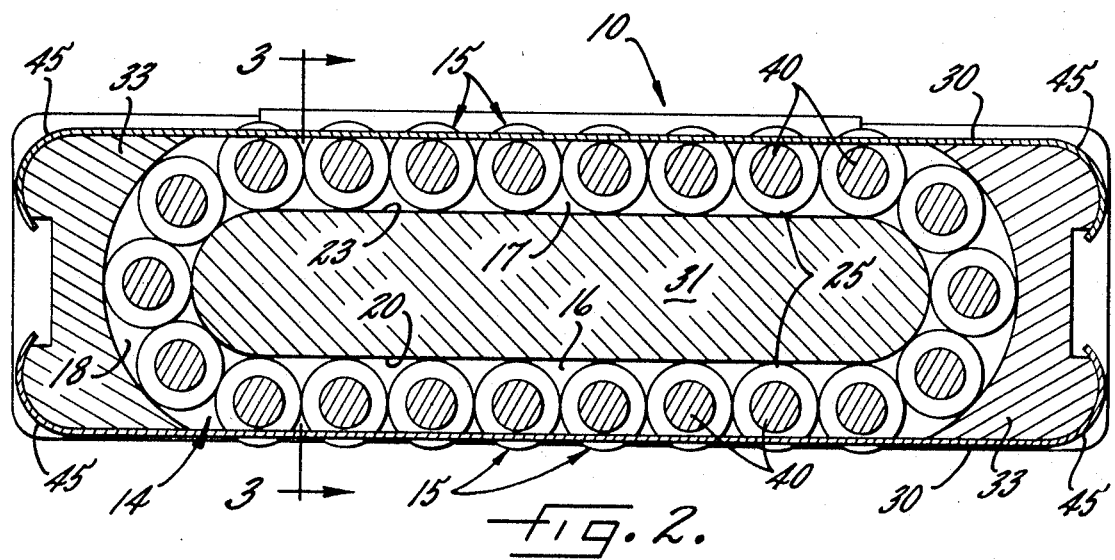
FIG. 2 is an enlarged cross section taken vertically through the bearing shown in FIG. 1, the crown of the rollers being shown on a greatly enlarged scale.

As shown in the drawings for purposes of illustration, the invention is embodied in a roller way bearing 10 for supporting a movable member 11 (FIG. 1), such as a table or carriage of a machine tool, for rectilinear movement on a way 13 of a stationary member such as the bed of the machine. The bearing is adapted to be mounted on the carriage 11 and is formed with a race 14 (FIG. 2) through which a series of elongated rollers 15 continuously circulate single file as the carriage is moved along the way, the race having a lower active run 16, an upper parallel return run 17, and connecting runs 18 disposed at the ends of the bearing and joining the active and return runs.

As the rollers 15 travel along the active run 16, they ride on a load track 20 which is formed interiorly of the bearing and which parallels the upper surface 21 of the way 13. The rollers moving along the active run project downwardly from the bearing 10 to roll on the way surface 21 and thus support the carriage 11 for back-and-forth movement on the way by rolling between the load track and the way surface. As the rollers move along the return run 17, they roll on a return track 23 which parallels the load track and which is spaced downwardly from the carriage sufficiently far to prevent engagement of the rollers with the carriage.

During the time the rollers 15 are riding on the load track 20, they are loaded radially by virtue of the weight of the carriage 11 pressing the rollers between the load track and the way surface 21. Also, the carriage 11 usually is deflected to some extent as a result of the carriage tending to deflect like a simple beam, such that the load track does not parallel the way (see FIG. 1a).

In accordance with the primary aspect of the present invention, the rollers 15 are crowned convexly along their length to increase their capacity to withstand heavy radial loading, to enable better compliance of the rollers with the way 21 when the carriage 11 is deflected, and thus to reduce the tendency of the rollers to skew on the load track 20 relative to the direction of movement of the carriage. By crowning the rollers, the latter may rock on the way when the carriage is deflected so that the radially directed forces, instead of being concentrated at the inboard end of each roller, are distributed more uniformly along the entire load-bearing length of the roller to increase the ability of the roller to carry heavier loads for longer periods of time without failing. The more even distribution of the loading resulting from crowning reduces the exertion of unequal forces at the ends of the roller and causes the frictional force acting along the length of the roller to be more uniform so as to effectually reduce skewing of the roller.

More particularly, each roller 15 herein is formed with a central load-bearing portion 25 (FIGS. 3 and 4) which is of circular cross section and which preferably is crowned symmetrically from its center to its ends. The length-to-diameter ratio of the load-bearing portion is approximately 2:1 and the magnitude of the crown is small as compared to the diameter of the load bearing portion. For example, with one specific roller having a load bearing portion with a length of 0.40 of an inch and a major diameter of 0.2000 of an inch, the crown is only 0.0005 of an inch.

Figure 1A:
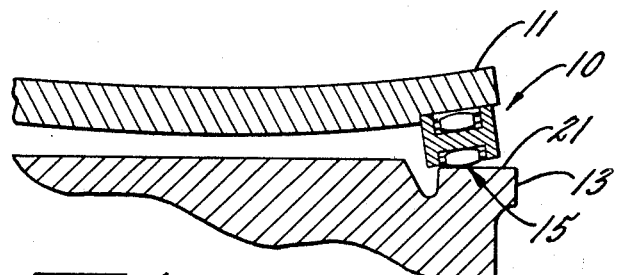
FIG. 1a is a reduced cross section taken substantially along the line 1a—1a of FIG. 1 and showing the bearing mounting member in a deflected condition.

Because of deflection of the carriage 11, the load track 20 does not precisely parallel the way surface 21 and, in addition, the rollers travelling along the active run 16 tend to become inclined upwardly relative to the way surface 21 (see FIG. 1a). Since the load-bearing portions 25 of the rollers are crowned, the rollers may rock on the track and the way and about the crowns to comply with the position of the track relative to the way and to conform to any geometrical irregularities in the track and way surfaces. Thus, more nearly perfect straight line contact is effected along the length of the rollers between the upper surfaces thereof and the load track 20 and between the lower roller surfaces and the way surface 21. As a result, the radial loading imposed on each roller is distributed more uniformly along the entire length of the load-bearing portion, thus relieving the concentration of the loading from the ends of the load-bearing portion and increasing the overall capacity of the roller to withstand heavy loads. With the loading equally distributed along the load-bearing portion, the frictional drag across every lengthwise increment of the load-bearing portion is more uniform to promote rolling of the roller in the precise direction of linear movement of the carriage and to avoid skewing and sliding as otherwise would be cause by the imposition of unequal drag forces on the opposite ends of the load-bearing portion.

The invention also contemplates retaining the ends of the rollers 15 in the race 14 in a novel and simplified manner which leaves the rollers free to align themselves to roll in the precise direction of movement of the carriage 11 even though the race itself is slightly skewed or out of parallelism relative to the direction of movement as a result of inaccuracies in mounting the bearing 10 on the carriage. This is accomplished in the present instance through the use of retainers 30 (FIGS. 2 and 3) which are operable to hold the ends of the rollers in the race without influencing the direction of rolling of the rollers and without restraining the freedom of the rollers to shift sidewise within the race as may be necessary to align themselves with the direction of movement of the carriage.

The foregoing may be best understood by first explaining in more detail the construction of the bearing 20 itself. Herein, the bearing comprises a blocklike central body 31 (FIG. 2) which is rectangular in cross section and which is formed with upper and lower U-shaped channels opening out of the upper and lower sides of the body, respectively, and defining the return and active runs 17 and 16 of the race 14. The return track 23 is formed by the closed end or bottom surface of the U-shaped return run 17 while the load track 20 is defined by the bottom of the active run 16. To form the connecting runs 18, end caps 33 (FIGS. 1 and 2) are connected to each end of the body 31 by screws 34 and are formed with arcuate grooves defining the connecting runs and communicating with the active and return runs. The bearing is adapted to be mounted on the carriage 11 by screws 35 which extend through upright holes formed in the body.

Figure 3:
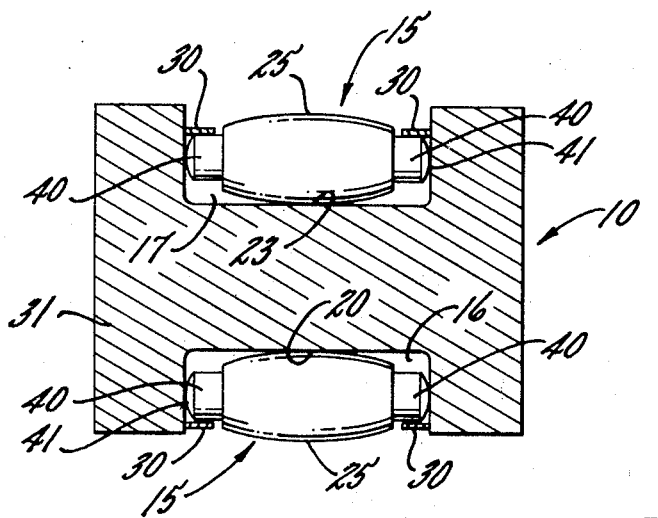
FIG. 3 is a cross section taken substantially along the line 3—3 of FIG. 2.
Figure 4:
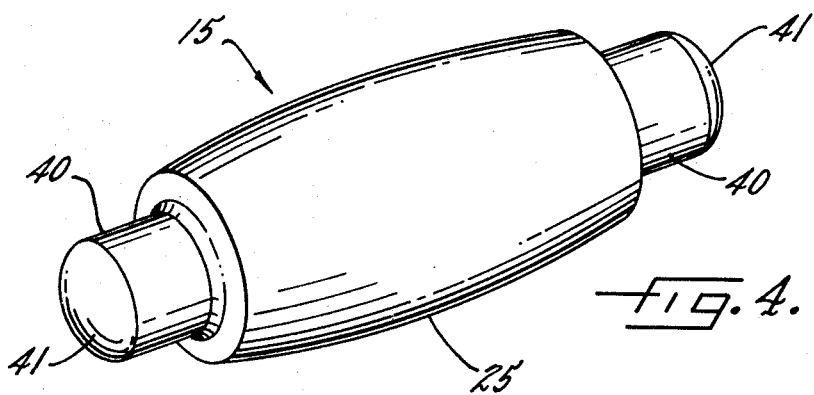
FIG. 4 is an enlarged perspective view of one of the rollers shown in FIG. 3.

As shown in FIGS. 3 and 4, each roller 15 is formed with reduced diameter trunnions 40 projecting from opposite ends of the load-bearing portion 25 and having outer end surfaces 41 which are disposed in closely spaced relation with the inboard sides of the U-shaped runs 16 and 17. The spacing between the outboard ends 41 of the trunnions and the inboard sides of the runs 16 and 17 is quite small, no greater than approximately 0.003 of an inch, and thus the rollers are guided by the sides of the active run as they roll between the load track 20 and the way surface 21. Preferably, the outboard ends 41 of the trunnions are formed on a full spherical radius, as shown in FIG. 4, to avoid scuffing the inboard sides of the runs.

The retainers 30 for holding the rollers 15 in the race 14 are in the form of spring metal straps which extend longitudinally of the load and return tracks 20 and 23 and tangentially across the trunnions 40 of the rollers, the retainers being formed with hooked end portions 45 (FIG. 2) that are snapped around the end caps 33 to hold the retainers in place. Four retainers are used with the lower two extending across the oppositely extending trunnions of the rollers on the load track and the upper two across the trunnions of the rollers on the return track. It will be seen from FIG. 3 that the spacing between the inboard edges of the retainers and the outboard ends of the enlarged load-bearing portions 25 of the rollers is considerably greater than the spacing between the inboard sides of the runs 16 and 17 and the outboard ends 41 of the trunnions. Thus, the load-bearing portions 25 do not engage the retainers. The retainers simply hold the rollers in the runs, and the surfaces of the trunnions facing the tracks are free of any supporting or guiding elements.

When the rollers 15 are under load on the load track 20, vertical clearance exists between the lower surfaces of the trunnions 40 and the opposing surfaces of the lower retainers 30. This, together with the lateral clearance between the retainers and the load-bearing portions 25 and the freedom of the trunnions from overlying support, enables the rollers to shift within the active run 16 of the race 14 to the extent permitted by the lateral clearance between the end surfaces 41 of the trunnions and the opposing sides of the active run. Thus, even though the active run of the bearing may be slightly skewed with respect to the line of travel of the carriage 11, the rollers are free to a certain degree to align themselves automatically in the run to roll perpendicular to the line of travel and along the path of least resistance since the retainers only hold the rollers in the race and do not restrict or guide the rollers. In addition, the retainers leave the rollers free to rock about their crowned load-bearing portions 25 as dictated by the surface condition of the load track 20 and the way surface 21.

Figure 5:
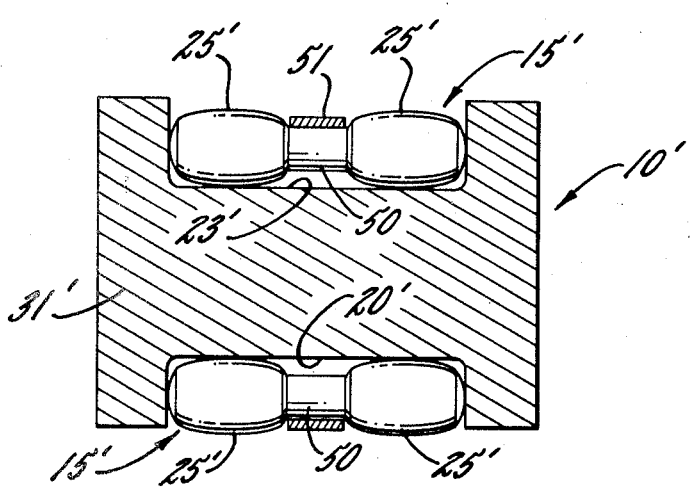
FIG. 5 is a view similar to FIG. 3 but showing a second embodiment of a bearing incorporating certain features of the invention.

A modified roller way bearing 10' embodying the features of the invention is shown in FIG. 5 in which parts corresponding to those of the first embodiment are indicated by the same but primed reference numerals. In this instance, each roller 15' is formed by two crowned load-bearing positions 25' spaced axially from one another and connected by a reduced diameter portion 50 extending between the load bearing portions 25' and centered on the longitudinal axes of the tracks 20' and 23'. Each load bearing portion is crowned convexly and symmetrically from its center to its ends to cause the radial loading to be distributed along the length of the load-bearing portion. While spring-type straps could be used, the rollers 15' preferably are held in the race of the bearing 10' by an endless elastic band 51 which is tensioned around the rollers and fitted into the grooves defined by the reduced diameter connecting portions 50. As the rollers circulate, the band moves around the race with the rollers.

From the foregoing, it will be apparent that the present invention brings to the art new and improved recirculating roller way bearings having convexly crowned rollers which possess a higher load capacity and which exhibit less tendency to skewing then prior rollers. Because the loading is distributed more uniformly along the rollers, abnormal stressing and wear of the portions of the load track adjacent the ends of the rollers are also avoided. The service life and effectiveness of the bearing thus are increased.

Still another novel recirculating roller way bearing 60 is shown in FIGS. 6 to 11 and is a compound bearing secured to a fixed bed 61 (FIG. 6) and adapted to support a movable table 63 having V-shaped ways 64. At least two bearings 60 are anchored to the bed on each side of the table along the path of movement thereof and each comprises a pair of bearing units 65 and 66 disposed at an angle to one another so as to define a V correlated with the shape of the adjacent way 64. Alternatively, the bearings could be carried on the table. The two bearing units 65, 66 are formed by a single body 67 (FIG. 7) and each includes U-shaped load and return races 69 and 70. Separate end caps 71 (FIGS. 8 and 10) are fastened to the ends of each bearing unit and are formed with curved races 73 connecting the load and return races. Crowned rollers 74 formed with chamfered outer ends 74a (FIG. 11) circulate in the races with the rollers in the load race of the lower unit 65 riding along the lower surface of the way 64 and the rollers in the load race of the upper unit 66 riding along the upper surface of the way.

By using the V-bearing 60, the number of bearings needed to provide support for the ways 64 on all sides thereof is reduced. In addition, the table 63 may be placed in a preloaded condition simply by applying a preloading force in a single direction to a single bearing at each end of the table.

Novel and simplified means are provided for holding the rollers 74 in the load races 69. Herein, these means comprise one-piece clips 75 (one shown in FIG. 10) made of spring steel and adapted to be connected to the end caps 71 with a snap fit, there being one clip for each bearing unit 65, 66. Each clip is formed with retaining straps 76 extending longitudinally along opposite sides of the load race 69 adjacent the open side thereof. The inner or free edge portion of each strap is formed with a wing 77 (FIG. 11) which is inclined away from the open end of the load race at an angle correlated with the inclination of the chamfers 74a on the rollers 74. The wings extend into the load race and lie alongside the chamfers to retain the rollers in the race. When the rollers are under load, the wings normally do not engage the chamfers, thus leaving the rollers free to align themselves in the race.

Each end portion of each clip 75 is formed with means which are engageable with the adjacent end cap 71 to hold the clip in place on the end caps and the body 67. These means comprise side webs 79 (FIG. 8) formed integrally with the ends of the retainer straps 76 and spanned by an integral end web 80, the webs defining an opening 81 adjacent the end of the clip. In the installed position of the clip, blocks 83 (one shown in FIG. 8) formed integrally with the end caps 71 project through the openings 81 and engage the webs 79 and 80 to hold the clips 75 in place. Advantageously, each end web 80 is formed with a curved lip 84 (FIGS. 8 and 9) which is adapted to snap into a groove 85 (FIG. 9) formed in and extending transversely across the adjacent block 83. To install the clip, one of the lips is first hooked into the groove of one of the blocks. The other end of the clip then is moved toward the block at the corresponding end of the bearing 60 with the lip 84 first engaging a rounded external corner 86 (FIG. 9) on the block and being cammed outwardly. With continued movement of the clip, the lip passes along the outer surface of the block and then snaps into the groove 85 to anchor the clip in place.

As shown most clearly in FIG. 8, each end cap 71 is offset from the side of the body 67 defining the load race 69 thereby to form steps 87 at the junctions of the body and the end cap. Each side web 79 is formed with a bent portion 89 adjacent the step so that the retaining straps 76 and the side webs 79 lie against and are backed by the surfaces of the body 67 and the end caps 71, respectively.

With the foregoing arrangement, only a single clip 75 is needed to hold the rollers 74 in each load race 69. The clip simply may be snapped into place and yet is securely held on the body 67 and the end caps 71 so as to prevent the rollers from escaping out of the open side of the load race.

The bearing 66 also includes improved retainers 90 for holding the rollers 74 in the return races 70. As shown most clearly in FIG. 7, the retainers 90 are in the form of flat cover plates made of spring metal and extending along the length of the return races between the end caps 71. Each cover plate 90 is bowed transversely and inwardly toward the return race and its edges are snapped into longitudinally extending grooves 91 (FIG. 7) formed in the sides of the return race. Each resilient cover plate 90 is of such a width that, when installed, the plate remains bowed inwardly as shown in FIG. 7. Accordingly, if the rollers 74 are forced outwardly against the plate, the latter is subjected to a straightening force and its edges tend to be forced even more tightly into the grooves 91 thereby to prevent escape of the rollers. The end caps 71 prevent endwise sliding of the cover plates in the grooves.

I claim as my invention:

1. In a recirculating roller way bearing for supporting two opposing members for relative linear movement, the combination of, an elongated body adapted to be anchored to one of the members and having longitudinally extending load and return tracks on opposite sides thereof, said load track being flat and planar, a series of rollers retained on the extending transversely of said tracks and riding along the tracks on side-by-side relation, each of said rollers having a load bearing portion which, when the roller is riding on said load track, is adapted for bearing engagement with the other of said members and is loaded radially as a result of such engagement, and each of said rollers being crowned convexly lengthwise of its load-bearing portion and symmetrically from the center toward the ends of such portion thereby to promote uniform distribution of the radial loading along the length of the load-bearing portion and to reduce transverse skewing of the roller caused by uneven distribution of the loading.

2. A roller way bearing as defined in claim 1 in which the load-bearing portion of each roller is crowned symmetrically along its entire length and from its center to its ends.

3. A roller way bearing as defined in claim 2 in which the load-bearing portion of each roller is centered on the longitudinal axes of said tracks, and further including reduced diameter trunnions projecting from the ends of the load-bearing portion of each roller and located adjacent the side margins of the tracks.

4. A roller way bearing as defined in claim 3 in which the outboard end surfaces of said trunnions are formed with a spherical contour.

5. A roller way bearing as defined in claim 3 in which all of said rollers ride single file along said tracks.

6. A roller way bearing as defined in claim 2 in which each of said rollers is formed with a pair of load-bearing portions spaced from one another axially of the roller, each of said pair of load-bearing portions being crowned convexly and symmetrically from its center to its ends, and further including a reduced diameter retaining portion disposed between and interconnecting the two load-bearing portions of each roller and centered on the longitudinal axes of the tracks.

7. In a recirculating roller way bearing for supporting two opposing members for relative linear movement, the combination of, a bearing unit comprising an elongated body adapted to be anchored to one of the members and having longitudinally extending load and return tracks on opposite sides thereof, said load track being flat and planar, a series of rollers retained on and extending transversely of said tracks and riding along the tracks in side-by-side relation, each of said rollers having a load-bearing portion which, when the roller is riding on said load track, is adapted for bearing engagement with the other of said members and is loaded radially as a result of such engagement, and each of said rollers being crowned convexly lengthwise of its load-bearing portion thereby to promote uniform distribution of the radial loading along the length of the load-bearing portion and to reduce transverse skewing of the roller caused by uneven distribution of the loading.

8. A roller way bearing as defined in claim 7 further comprising an additional bearing unit substantially identical to said one unit, said bearing units being anchored together with their load tracks disposed at an angle to one another and generally defining the sides of a V.

9. In a recirculating roller way bearing, the combination of, an elongated body having generally U-shaped load and return races opening out of opposite sides thereof with the bottom of each U defining a track extending longitudinally of the body, end caps fastened to the ends of said body and having curved races connecting said load and return races, a series of rollers extending transversely of said races in side-by-side relation and having enlarged load-bearing central portions riding along said tracks, inclined chamfers of reduced diameter located at the opposite ends of the central portion of each roller and having outboard ends facing the sides of said races in closely spaced relation with such sides, the inclined sides of said chamfers facing the tracks being free of engagement with said races, a one-piece clip of resiliently yieldable material having sides defining retaining straps extending longitudinally of said load race and generally tangentially across the opposite sides of the chamfers of the rollers in the load race to hold the rollers in such race, said retaining straps having inner edge portions extending into said load race and inclined away from the open end of such race at an angle correlated with the inclination of said chamfers whereby said inner edge portions lie alongside said chamfers, and means on the ends of said clip engaging said end caps with a snap fit to hold said clip on said body and said end caps.

10. In a recirculating roller way bearing, the combination of, an elongated body having generally U-shaped load and return races opening out of opposite sides thereof with the bottom of each U defining a track extending longitudinally of the body, end caps fastened to the ends of said body and having curved races connecting said load and return races, a series of rollers extending transversely of said races in side-by-side relation and having enlarged load-bearing central portions riding along said tracks, reduced diameter end surfaces located at the opposite ends of the central portion of each roller and having outboard ends facing the sides of said races in closely spaced relation with such sides, a one-piece clip made of resiliently yieldable material for retaining said rollers in said load race, said clip having retaining straps extending along opposite sides of said load race near the open end thereof and extending generally tangentially across the end surfaces of the rollers in said load race, and said clip having end portions integral with and spanning said retaining straps and engaging said end caps with a snap fit to hold said clip on said body and said end caps.

11. A roller way bearing as defined in claim 10 in which said reduced diameter end surfaces are defined by inclined chamfers formed on opposite ends of the central portion of each roller, said retaining straps having inner edge portions extending into said load race and inclined away from the open end of such race at an angle correlated with the inclination of said chamfers whereby said inner edge portions lie alongside said chamfers.

12. A roller way bearing as defined in claim 10 in which each end portion of said clip is formed with side and end webs defining an opening, said side webs being bent twice to extend inwardly from and then parallel to said retaining straps adjacent the ends of said body, a portion of each end cap projecting through the opening in the respective end portion of the clip, and a transversely extending groove formed in each end cap and receiving the adjacent end web with a snap fit to hold said clip on said end caps.

13. A roller way bearing as defined in claim 12 further including a curved lip formed along the inner edge of each end web and sized to fit snugly in said groove, at least one of said end caps having a rounded external corner located at the side of said body adjacent the open end of said load race and positioned to cam against and spring the associated lip outwardly as an incident to installation of said clip on said end caps and said body so that said lip may thereafter snap into its respective groove.

14. A roller way bearing as defined in claim 10 further including longitudinally extending grooves formed along the inner sides of said return race near the open end thereof, a resiliently yieldable cover plate extending longitudinally of said return race and across the rollers therein and having edges received in said grooves with a snap fit, said plate being bowed transversely and inwardly toward the rollers in said return race whereby any outward force exerted on said plate tends to force the edges thereof more tightly into said grooves.

* * * * *